United States Patent [19]
Wiig

[11] 3,735,843
[45] May 29, 1973

[54] DISC BRAKE STRUCTURE
[75] Inventor: Chester M. Wiig, Lincolnwood, Ill.
[73] Assignee: F. J. Littell Machine Company, Chicago, Ill.
[22] Filed: Sept. 10, 1971
[21] Appl. No.: 179,318

[52] U.S. Cl. ............. 188/72.1, 188/71.1, 188/71.7, 188/72.4, 188/73.2, 188/73.3, 188/166, 192/70.27
[51] Int. Cl. .............................................. F16d 65/20
[58] Field of Search .................... 188/166, 167, 170, 188/71.1, 71.5, 72.1, 72.4, 72.9, 72.6, 73.2, 73.3, 196 M; 192/70.19, 70.25, 70.27

[56] References Cited
UNITED STATES PATENTS

| | | | |
|---|---|---|---|
| 2,672,226 | 3/1954 | Zeidler | 192/70.27 X |
| 3,456,767 | 7/1969 | Hollnagel et al. | 188/170 |
| 2,620,901 | 12/1952 | Stearns | 188/196 M |
| 3,260,331 | 7/1966 | Borman, Jr. | 188/170 X |
| 3,517,778 | 6/1970 | Knapp | 188/73.3 |

FOREIGN PATENTS OR APPLICATIONS
201,810   2/1966   Sweden ............................ 188/72.4

*Primary Examiner*—George E. A. Halvosa
*Attorney*—Russell H. Clark

[57] ABSTRACT

The present brake device, primarily designed for intermittently rotating shafts, includes a pair of stationary pressure brake plates located on respective sides of a hub member fixed to the shaft. The pressure brake plates are anchored by link elements one of which is disposed at right angles to the remaining link elements to secure a non-rotatable but stable mounting of the brake plates. The hub member carries a plurality of replaceable friction brake inserts and the pressure brake plates are resiliently clamped into friction contact with the hub member which is located therebetween by a plurality of bolt and coil spring combinations carried in turn by one of the brake plates and by a face plate adapted to have contact with the other brake plate. By means of an adjusting nut the clamping pressure of the bolt and coil spring combinations can be adjusted.

5 Claims, 10 Drawing Figures

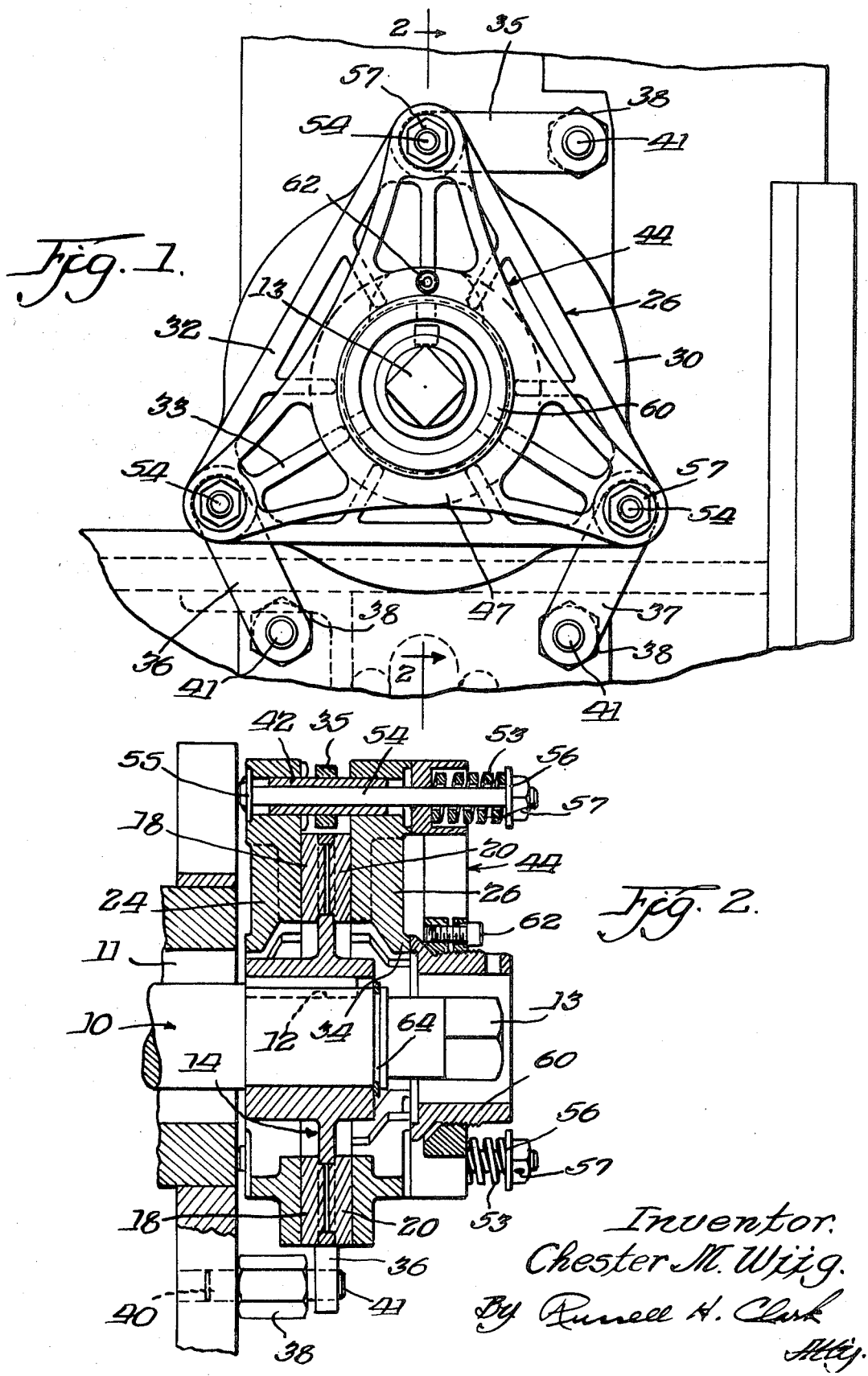

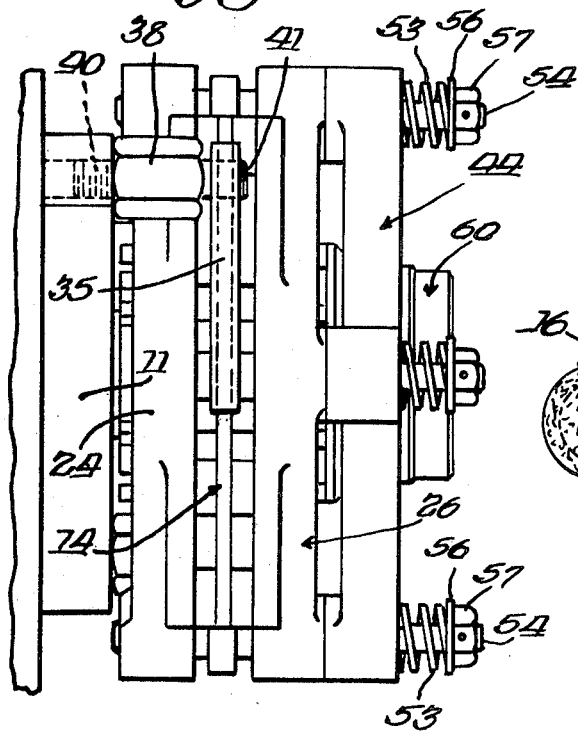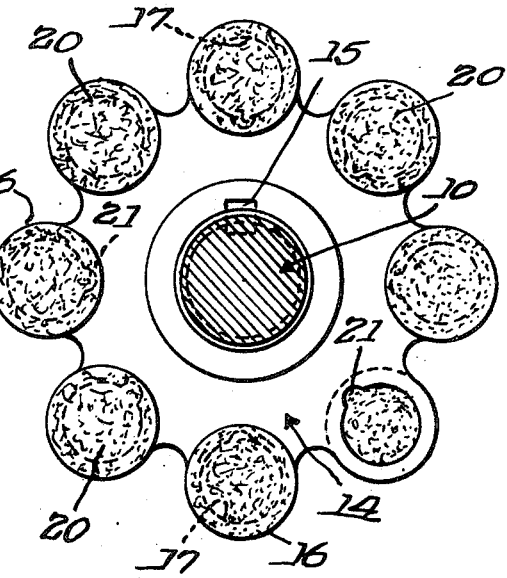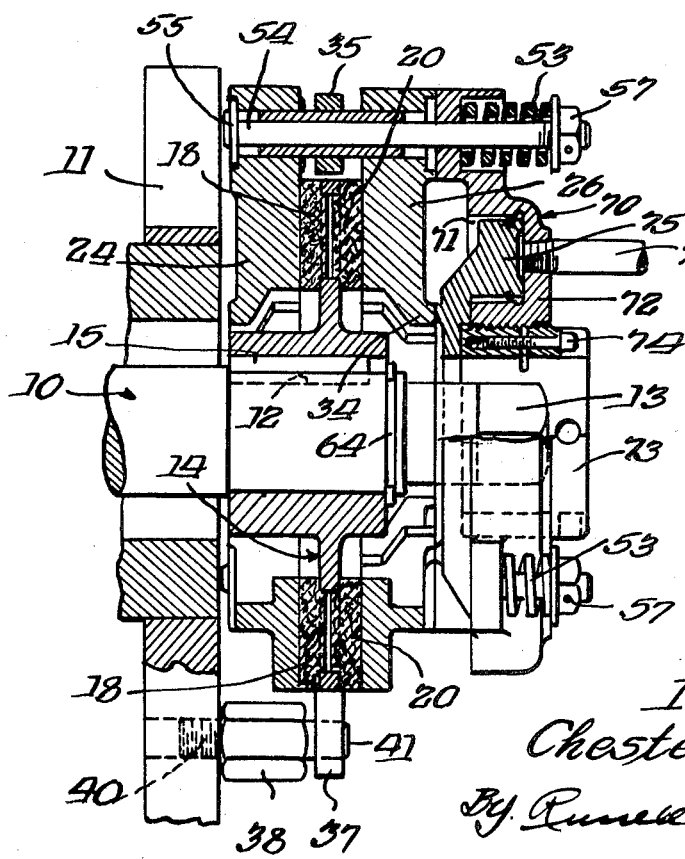

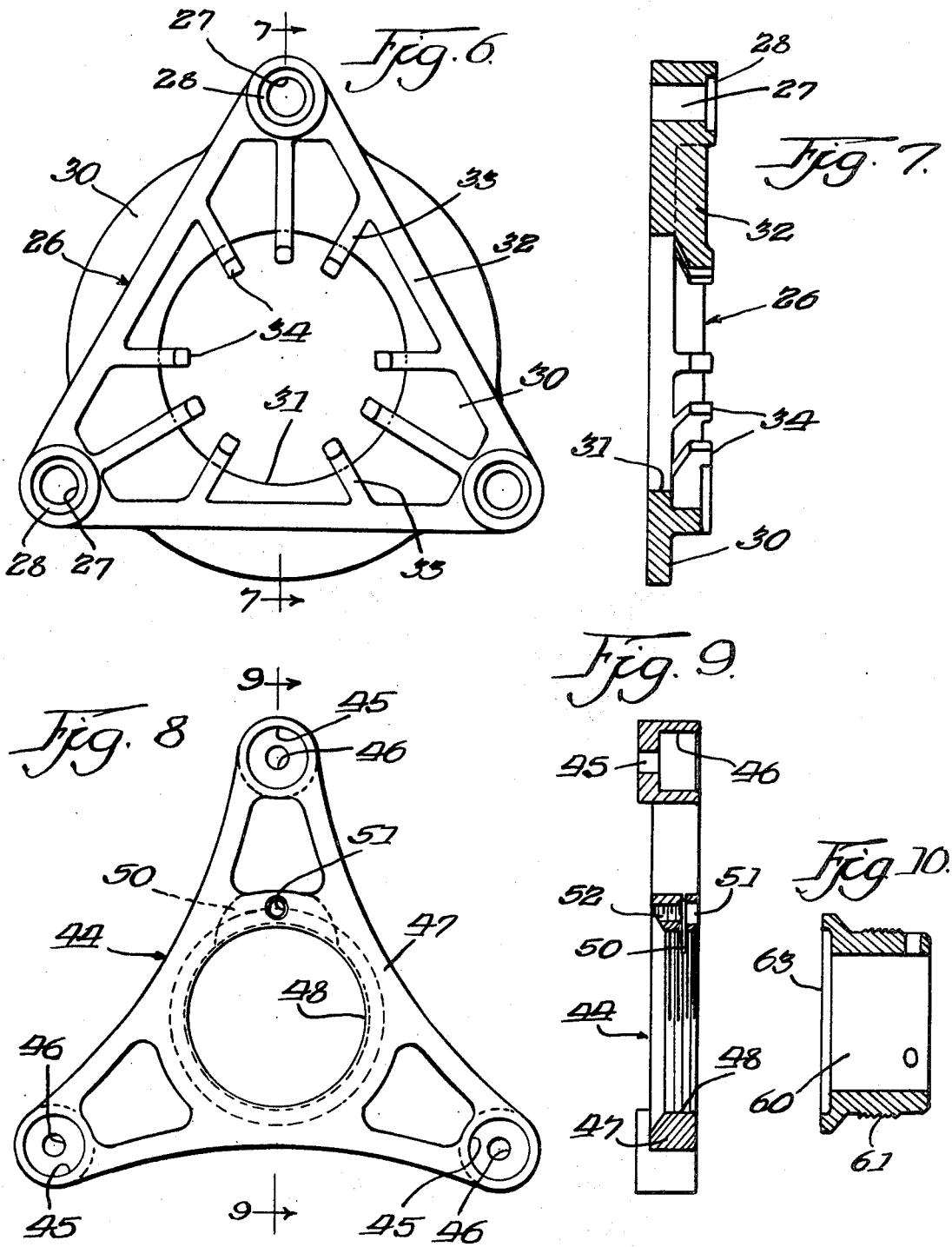

DISC BRAKE STRUCTURE

The invention relates to brake structure and has reference more particularly to brake structure of the disc type wherein a hub member fixed to the rotating shaft carries a plurality of replaceable inserts of friction brake material and wherein a pair of pressure brake plates disposed on respective sides of the replaceable inserts are link supported from the frame of the machine.

In certain roll feeding machines it is necessary to rotate the feeding rolls in an intermittent manner and because of this continuous starting and stopping action such machines require braking devices to help stop rotation and prevent overrun, thus maintaining accuracy in the feeding length. Accordingly an object of the invention resides in the provision of improved friction brake structure for use on intermittently rotating shafts which will have unique anchoring links for mounting and supporting the stationary pressure plates of the brake structure on the frame of the machine thus preventing rotation of the said plate elements and anchoring them in a rigid and completely satisfactory stable manner.

Another object of the invention is to provide disc brake structure wherein the stationary pressure brake plates of the same are anchored at three places by link elements and wherein one of such link elements is disposed substantially at right angles to the other two whereby to secure a non-rotatable but stable mounting of the brake plates.

Another object is to provide a novel and improved hub member for a disc brake device which will carry a plurality of replaceable inserts of good brake material and which will be anchored in openings in the hub member in a manner to prevent their rotation in said openings during a braking action.

A further object of the invention is to provide brake structure of the disc brake type, the same consisting of a pair of brake plates positioned on respective sides of a hub member carrying replaceable friction brake inserts and wherein a face plate and coil springs are employed to yieldingly clamp the brake plates with the hub member interposed therebetween.

Another object resides in the provision of disc brake structure as described which will be adjustable as to the braking action produced thereby by reason of a threaded nut carried by the face plate and having contact with one of the pressure plates and wherein the said face plate is locked in adjusted position on the nut.

Another object is to provide a disc brake device of the type as described and which will incorporate a fluid actuated piston member disposed between the face plate and the adjacent brake plate and in contact with the brake plate, whereby a braking action on the replaceable inserts can be effected by the application of fluid pressure to actuate the piston member.

These and various other objects in view the invention may consist of certain novel features of construction and operation as will be more fully described and particularly pointed out in the specification, drawings and claims appended thereto.

In the drawings which illustrate an embodiment of the present disc brake device and wherein like reference characters are used to designate like parts, FIG. 1 is a front elevational view of disc brake structure incorporating the improved features of the present invention;

FIG. 2 is a vertical sectional view taken substantially on line 2—2 of FIG. 1 and looking in the direction of the arrows;

FIG. 3 is a side elevational view of the disc brake structure shown in FIG. 1;

FIG. 4 is a face elevational view of the hub member showing the replaceable inserts of braking material;

FIG. 5 is an elevational view similar to FIG. 1 but showing a modified form of the invention wherein a fluid actuated piston member is provided for effecting a quick and intensified braking action;

FIG. 6 is a front face view of one of the pressure brake plates;

FIG. 7 is a vertical sectional view taken on line 7—7 of FIG. 6;

FIG. 8 is a front face view of the face plate;

FIG. 9 is a vertical sectional view taken substantially on line 9—9 of FIG. 8, and FIG. 10 is a vertical sectional view taken through the adjusting nut.

The disc brake structure of the invention is illustrated in the drawings in association with an intermittently rotating shaft 10 suitably supported and journalled for rotation by the frame structure 11. The said shaft projects a short distance beyond and to the right of the frame structure and has a key way slot 12 formed therein and a reduced squared end 13. The squared end is made easily accessable to the operator for inching the feeding rolls.

The hub member 14 is mounted on the right hand projecting end of the shaft 10 between the frame structure 11 and the squared end 13 and the hub member is conveniently keyed to the shaft by the key member 15 which fits into the slot 12. The web of the hub member is formed with arcuate peripheral portions 16 and in FIG. 4 eight of these said portions are disclosed. Each peripheral portion is apertured thus forming an opening 17 of substantially circular shape and which receives inserts 18 and 20 of friction braking material. The inserts may be composed of any good braking material such as hard fiber and fiber compositions, asbestos compositions, leather board, cork and the like and each insert if circular as shown in FIG. 4 is preferably formed with a half moon projection 21 which interfits with a recess formed in the opening 17 to lock the insert against rotation in its opening. The inserts can be conveniently removed and thus when they wear down to the extent where good braking action is lost they can be replaced.

The hub member 14 together with the replaceable inserts 18 and 20 is disposed between a pair of pressure brake plates 24 and 26 which are formed of any suitable metal and have the unique triangular shape as best shown in FIG. 6. The brake plates are similar in construction and the same are mounted in supported relation from the frame structure 11 and positioned on respective sides of the hub member 14. Thus brake plate 24 is in friction contact with the inserts 18 and brake plate 26 is in friction contact with the inserts 20. To produce a braking action the brake plates 24 and 26 apply pressure to the inserts 18 and 20 or more particularly the inserts are clamped between the said brake plates. By referring to FIGS. 6 and 7 it will be seen that each pressure plate is substantially triangular in shape having an opening 27 at each corner with each opening being recessed at 28. The web 30 of the brake plate is substantially circular having a diameter which will at least equal the maximum diameter of the hub member including the portions 16. Also the web is formed with a central opening 31 and with ribs 32 and 33, with the latter terminating in pressure pads 34 and which are thus disposed in circular relation concentric with the central opening 31.

The pair of brake plates 24 and 26 are mounted on and supported by the frame 11 of the machine. In accordance with the invention links are employed such as 35, 36 and 37 with the link 35 being disposed substantially at right angles to the other two as best shown in FIG. 1. A bolt 38 for each link is threadedly secured at 40 in the frame structure and said bolt provides a stud shaft 41 on which the link is pivotally supported. Each of the links 35, 36 and 37 at their opposite end is press fitted onto a sleeve 42 and the sleeve in turn is received in an opening 27 of each of the brake plates. One end of the sleeve is thus journalled in an opening 27 in brake plate 24 and the other end of the sleeve is journalled in opening 27 in brake plate 26. This places the link between the brake plates substantially in alignment with the hub member. The link mounting is a desirable feature since the brake plates are held against rotation and a rigid assembly is obtained. The link 35 locks up the said brake plates in torsion and thus provides a stable friction brake combination.

Pressure is applied to the brake plates 24 and 26 by a plurality of coil springs, and the pressure transmitted by the brake plates to the hub member and inserts is regulated by a face plate. In FIG. 2 the face plate 44 is shown in vertical section and FIGS. 8 and 9 show the face plate in detail. The unique triangular shape is carried over into the face plate which has an opening 45 in each corner the same being recessed at 46. The circular portion 47 located centrally of the triangular shaped face plate is internally threaded at 48 and thus the circular hub portion is slotted at 50 for an angular extent of about 80° to provide an area of the ring portion 47 that can be deformed for locking purposes to be presently described. For such locking purposes the ring portion approximately centrally of the slotted area is formed with a screw opening 51 which is threaded at 52 in the base part.

The coil springs 53 each have seating relation in the base of the recessed openings 46, FIG. 9, and each coil spring is individually held in place by an elongated bolt 54. Each bolt at its left hand end has a welded head 55 which retains a washer in the recess 28 of the brake member 24. The bolt then passes through its respective sleeve 42 and through the opening 45 and recess 46 to project beyond the face plate 44 and receive its coil spring 53. At this left hand end of each bolt 54 the same receives a washer 56 held to the bolt by a threaded nut 57, and thus the coil springs 53 are confined between the face plate 44 and their particular washer 56. To prevent the nuts 57 from turning on their bolt the same can be pin locked.

By reason of the tension exerted by the coil springs the face plate 44 is resiliently urged into contact with the pressure plate 26 and the said pressure plates are resiliently urged into contact with the inserts 18 and 20 respectively. For a better statement it might be said that coil spring and bolt combinations clamp the hub member 14 and thus the brake inserts 18 and 20 between the brake plates 24 and 26.

This clamping pressure exerted by the three coil spring and bolt combinations can be regulated by an adjusting nut 60 shown in an adjusted position in FIG. 2 and in section in FIG. 10. The exterior surface of the adjusting nut is threaded at 61 and the same has threaded relation with the threads 48 formed on the inside surface of the ring portion 47 of the face plate 44. The face plate can thus have an adjusted position on the nut 60 and the same can be locked in such position by the screw 62. By a turning of the screw the slotted part 50 of the ring 47 can be deformed and this effectively holds the adjusting nut and face plate in assembled relation.

The pressure surface 63, FIG. 10, of the adjusting nut 60 is adapted to have pressure contact with the pressure pads 34 of the brake plate 26 as clearly shown in FIG. 2. The expanding tension exerted by the coil springs 53 pushes against the face plate, and since the adjusting nut is carried by the face plate, the said nut is held in pressure contact with the pads 34 to resiliently force the brake plate 26 towards the left and into friction contact with the brake inserts 20. Similarly the expanding action of the coil springs will tend to force the bolts 54 to the right so that the brake plate 24 is resiliently forced into friction contact with the brake inserts 18.

When the face plate 44 is locked on the adjusting nut 60 as shown in FIG. 2, the braking action is relatively close to a minimum since the coil springs 53 are expanded to about a maximum extent. In order to increase the braking action the face plate is adjusted outwardly on the adjusting nut, that is, towards the right FIG. 2, and this will compress the coil springs thus increasing their tension on the brake plates 24 and 26 and thus the friction contact which the inside surfaces of the plates have with the brake inserts 18 and 20. The result is a more intensified braking action and which is in substantially direct proportion to the compressive action on the brake plates exerted by the coil springs.

The hub member 14 is keyed to the rotatable shaft 10 by the key 15 which fits into the keyway slot 16 and the hub member is retained on the shaft by the split locking ring 64, FIG. 2. The ring is located in a peripheral groove provided for the purpose on the shaft 10 and immediately beyond the same the shaft is reduced in diameter and its terminal end is squared at 13. This squared end is located centrally within the adjusting nut 60 and thus the shaft can be inched by the operator as is sometimes required in the operation of feeding rolls.

In the modified form of the invention shown in FIG. 5, a piston member is located within the face plate for a quick and intensified braking action. The face plate 70 is designed with an internal circular recess 71 located radially outward from the ring portion 72 which has threads on its inside surface for accomodating the threaded adjusting nut 73 all in a manner as described. Also in this modified form of the invention the face plate is instrumental in providing the bolts 54 and the coil springs 53 for resiliently clamping the hub member 14 and the brake inserts 18 and 20 between the brake plates 24 and 26. The piston member 75 is circular and ring like in shape and the same has a portion which is sealed by O-rings within the recess 71. By means of the conduit 76, which has connection with the face plate, a pressure fluid can be admitted to the recess to the right of the piston and thereby produce a movement of the piston to the left. The piston is interposed between the adjusting nut 73 and the brake plate 26 and in this modification the piston member has a projecting ring which is in pressure contact with the pressure pads 34 of the brake plate 26.

The adjusting nut 73 has the same regulating function as described for the nut 60 of FIGS. 1 and 2. In normal operation the device of FIG. 5 will operate as previously described producing a braking action the intensity of which will depend on the locked adjusted position which the face plate may have on its adjusting nut. However should an immediate and quick stopping of the shaft 10 be desired, a pressure fluid such as oil or air under pressure can be admitted by the conduit 76 to force the piston 75 to the left. This movement of the piston will be transmitted to the brake plate 26 to increase the friction contact which the brake members have with the brake inserts.

What is claimed is:

1. In a brake device of the character described, the combination with a frame structure and a rotatable shaft having a portion projecting outwardly of the frame structure, of a hub member fixed to the outwardly projecting shaft portion and having a plurality of brake inserts of friction material, a pressure brake member disposed on each side of the hub member whereby each brake member is in friction contact with brake inserts carried by the hub member, a plurality of link members for supporting the pressure brake members from the frame structure, each of said link members at their ends having a secured relation with the brake members and with the frame structure respectively, at least one of said link members being disposed in a substantially right angled relation with respect to the remaining link members whereby to mount and support the brake members from the frame structure in a rigid and stable manner and which also prevents rotative movement of the said pressure brake members a face plate disposed outwardly of but in contact with the outward brake member, and bolt and coil spring combinations carried by the inside brake member and by the face plate respectively for resiliently biasing the brake members towards each other whereby to clamp the hub member and thus the friction inserts between the brake members, said bolt of each combination passing through an associated link of said link members 2. In a brake device of the character described, the combination with a frame structure and rotatable shaft having a portion projecting outwardly of the frame structure, of a hub member fixed to the outwardly projecting shaft portion and having a plurality of brake inserts of friction material, a pressure brake member disposed on each side of the hub member, whereby each brake member is in friction contact with brake inserts carried by the hub member, a plurality of link members for supporting the pressure brake members from the frame structure, each of said link members at their ends having a secured relation with the brake members and with the frame structure respectively, and at least one of said link members being disposed in a substantially right angled relation with respect to the remaining link members whereby to mount and support the brake member from the frame structure in a rigid and stable manner and which also prevents rotative movement of the said pressure brake members a face plate disposed outwardly of but in contact with the outward brake member, a plurality of elongated bolts located radially outward beyond the periphery of the hub member, each said bolt being fixed at one end to the inside brake member and extending through openings in the outside brake member and face plate to project beyond the latter, and a coil spring associated with each bolt and confined between the projecting end of its bolt and the face plate, whereby the bolt and coil spring combinations resiliently bias the brake members towards each other to effect a resilient clamping action on the hub member and friction contact with the brake inserts carried by the same, each of said bolts passing through an associated link of said link members.

3. In a brake device of the disc type, in combination, a frame structure and a rotatable shaft having a portion projecting outwardly from the frame structure, of a hub member fixed to the outwardly projecting shaft portion and having a plurality of inserts of friction brake material in spaced relation around the periphery thereof, a pressure brake member disposed on each side of the hub member whereby each brake member is in friction contact with the friction brake inserts carried by the hub member, a plurality of link members for supporting the pressure brake members from the frame structure, each of said link members at their ends having a secured relation with the brake members and with the frame structure respectively, at least one of said link members being disposed in a substantially right angled relation with respect to the remaining link members to mount and support the brake members in a rigid and stable manner and which prevents rotative movement of the said pressure brake members, a face plate disposed outwardly of and adapted to have contact with the outward brake member, a plurality of elongated bolts located radially beyond the periphery of the hub member, each said bolt being fixed at one end to the inside brake member and extending through openings in the outside brake member and also the face plate to project beyond the latter, a coil spring encircling each bolt and confined between the projecting end of its bolt and the face plate, whereby the bolt and spring combinations resiliently bias the brake members towards each other to effect a resilient clamping action on the hub member and friction contact with the brake inserts carried thereby, a piston member carried by the face plate and disposed so as to have contact with the said outside brake member, said face plate having a circular recess formed therein for receiving the piston and which has such sealing relation with the face plate as to permit axial movement with respect thereto, and means for admitting a pressure fluid to the recess in front of the piston to force the piston towards the adjacent outside brake member to thereby increase the friction contact between the brake members and the brake inserts and intensify the braking action.

4. In a brake device of the character described, the combination with a frame structure and a rotatable shaft having a portion projecting outwardly of the frame structure, of a hub member fixed to the outwardly projecting shaft portion and having a plurality of brake inserts of friction material, a pressure brake member disposed on each side of the hub member whereby each brake member is in friction contact with brake inserts carried by the hub member, a plurality of link members for supporting the pressure brake members from the frame structure, each of said link members at their ends having a secured relation with the brake members and with the frame structure respectively, at least one of said link members being disposed in a substantially right angled relation with respect to the remaining link members to mount and support the brake members from the frame structure in a rigid and stable manner and which prevents rotative movement of the said pressure brake members, a face plate disposed outwardly of but in contact with the outward brake member, a plurality of elongated bolts located radially outward beyond the periphery of the hub member, each said bolt being fixed at one end to the inside brake member and extending through openings in the outside brake member and also the face plate to project beyond the latter, and a coil spring encircling each bolt and confined between the projecting end of its bolt and the face plate, whereby the bolt and spring combinations resiliently bias the brake members towards each other to effect a resilient clamping action on the hub member and friction contact with the brake inserts carried by the same, said outside brake member being formed with a central opening and having a plurality of pressure pads concentric with he opening, said face plate also being formed with a central opening in substantial axial alignment with the opening in the outside brake member, and an adjusting nut having location in the central opening in the face plate and being threaded in said opening in an adjusted position, said adjusting nut having a ring-like surface which is maintained in resilient contact with the pressure pads by the bolt and coil spring combinations.

5. In a brake device of the character described in claim 4, wherein each link member at one end is located between the pressure brake members and is disposed in substantial alignment with the hub member, and wherein each link member has pivotal connection with the brake members by means of one of said elongated bolts.

* * * * *